(12) United States Patent
Chakravarty et al.

(10) Patent No.: US 8,998,101 B2
(45) Date of Patent: Apr. 7, 2015

(54) RFID TAG ENABLED ARTICLE AND A METHOD THEREFOR

(71) Applicant: Tata Consultancy Services Limited, Maharashtra (IN)

(72) Inventors: Tapas Chakravarty, West Bengal (IN); Balamuralidhar Purushothaman, West Bengal (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 0 days.

(21) Appl. No.: 14/179,664

(22) Filed: Feb. 13, 2014

(65) Prior Publication Data

US 2014/0239076 A1    Aug. 28, 2014

(30) Foreign Application Priority Data

Feb. 27, 2013 (IN) .......................... 577/MUM/2013

(51) Int. Cl.
    *G06K 19/06*    (2006.01)
    *G06K 19/077*   (2006.01)
    *G06K 19/04*    (2006.01)

(52) U.S. Cl.
    CPC .... *G06K 19/07749* (2013.01); *G06K 19/07773* (2013.01); *G06K 19/041* (2013.01); *G06K 19/07754* (2013.01); *G06K 19/07762* (2013.01)

(58) Field of Classification Search
    USPC ..................................... 235/492; 343/700 MS
    See application file for complete search history.

(56) References Cited

U.S. PATENT DOCUMENTS

| | | | |
|---|---|---|---|
| 6,320,509 B1 * | 11/2001 | Brady et al. | 340/572.7 |
| 7,253,735 B2 | 8/2007 | Gengel et al. | |
| 8,085,165 B2 * | 12/2011 | Wavering et al. | 340/870.02 |
| 8,235,299 B2 * | 8/2012 | Kato et al. | 235/492 |
| 2007/0040028 A1 * | 2/2007 | Kawamata | 235/435 |
| 2007/0152829 A1 * | 7/2007 | Lindsay et al. | 340/572.3 |

FOREIGN PATENT DOCUMENTS

| | | |
|---|---|---|
| JP | 2003-308504 | 10/2003 |
| KR | 20120000597 A | 1/2012 |

OTHER PUBLICATIONS

Sung-Joo Kim, Byongkil Yu1, Ho-Jun Lee, Myun-Joo Park, Frances J. Harackiewicz, and Byungje Lee , "RFID Tag Antenna Moutable on Metallic Plates" Dec. 1, 2005 , APMC2005 Proceedings.

* cited by examiner

*Primary Examiner* — Seung Lee
(74) *Attorney, Agent, or Firm* — Hayes Soloway PC

(57) ABSTRACT

A radio-frequency identification (RFID) tag assembly enabled article and methods therefor are provided. The RFID tag assembly enabled article includes a RFID tag assembly connected to an article with a pair of conducting strips, wherein the pair of conducting strips is connected between each end of the RFID tag assembly, respectively, and the article to form an electrical association of said RFID tag assembly with the article. The RFID tag assembly further comprising an antenna formed from said electrical association of the RFID tag assembly with the article and a RFID microchip securely embedded within at least one layer of a substrate of the RFID tag assembly, wherein said RFID microchip coordinates with the article and the antenna to establish a stable impedance matching network. A support structure holds at least one end of the article.

19 Claims, 9 Drawing Sheets

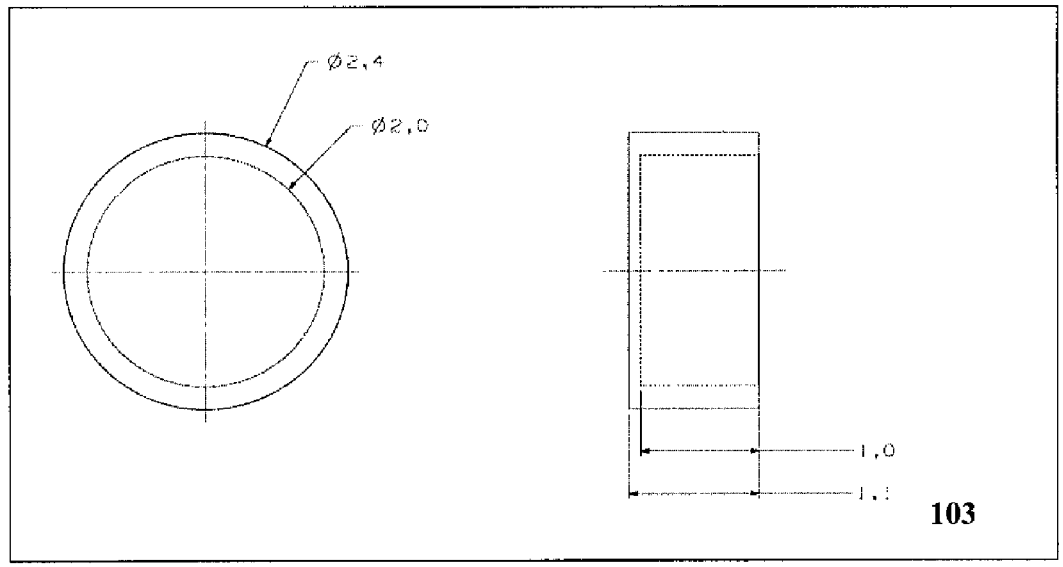
FIGURE 1A (i)
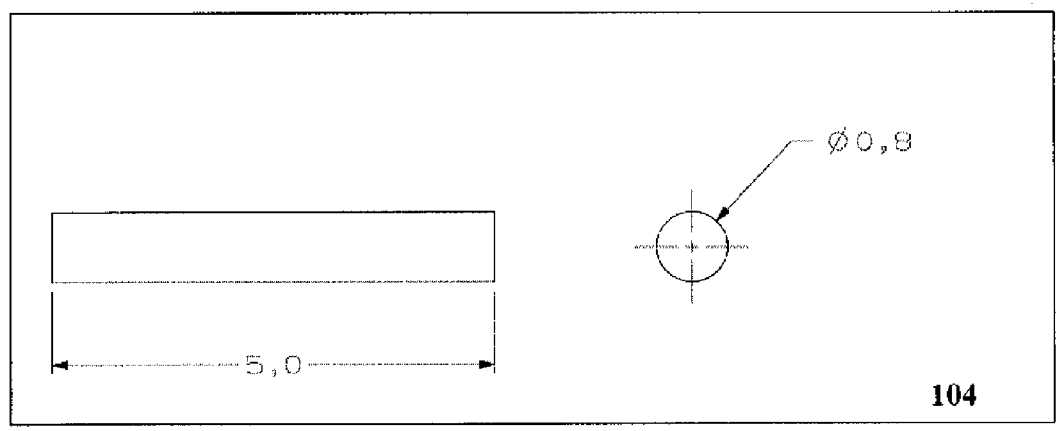
FIGURE 1A (ii)

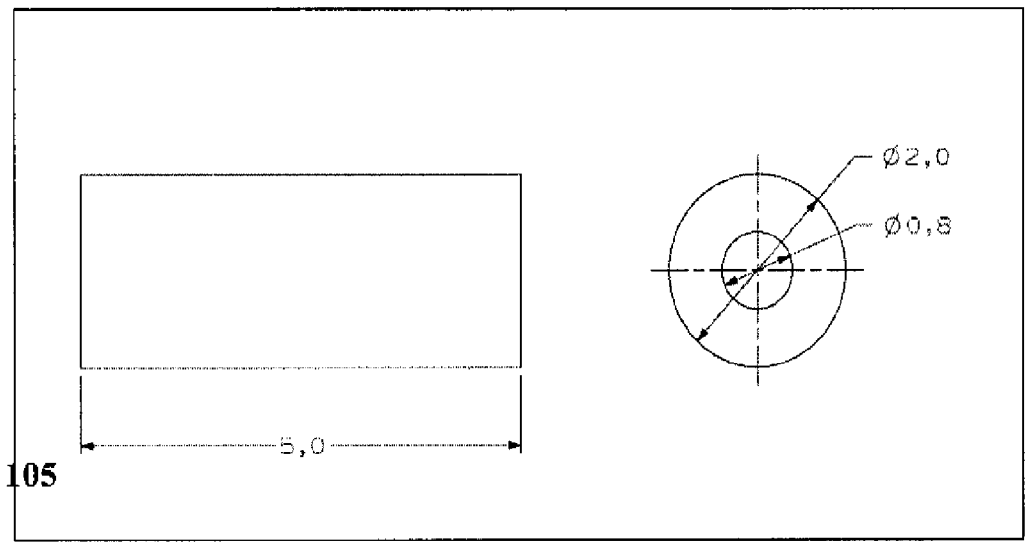
FIGURE 1A (iii)
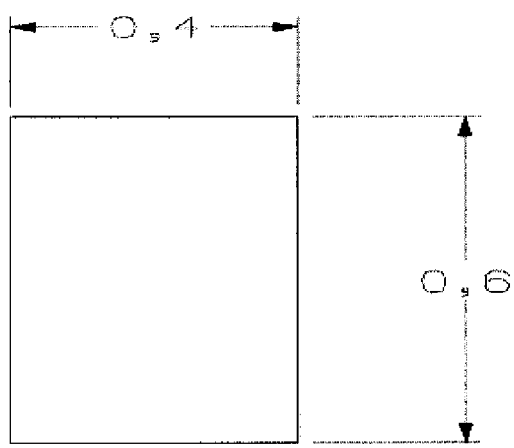
101
FIGURE 1A (iv)

Extrenal article

FRONT VIEW

SIDE VIEW

RFID TAG ENABLED ARTICLE AND A METHOD THEREFOR

FIELD OF THE INVENTION

The present disclosure relates generally to a RFID tag assembly. More specifically, the disclosure relates to a RFID tag enabled devices or articles and method of making the same.

BACKGROUND OF THE INVENTION

A general state of art presents RFID tags as a widely recognized technique which is quiet popular across multiple industrial segments. Currently, RFID tags are being manufactured in isolation by the industries, who effectively build these tags in bulk (with a few test environment assumptions). These RFID tags are generally reusable and are usually removed once the sale of the article is completed. The major components of the RFID technology are the RFID tag that carries the unique identification information of the article or item or design attached to it, and a RFID interrogator or reader that communicates with the RFID tag to read the signal either emitted by or backscattered from the tag. These transmitted signals are best read at higher frequencies and particularly ultra-high frequencies that enable greater detection range and equips the reader to read hundreds of them simultaneously.

Unfortunately, the ultra-high frequency (UHF) tags are seriously impacted by surrounding environment and particularly metals in proximity. Those skilled in the art will understand that, electronic interference of the metal results in remarkably decreased recognition of signals by the RFID tags. For assuring maximum efficiency, the input impedance of RFID chip needs to be matched with that of antenna. Hence any modification to the antenna deign affects the impedance matching and eventually the performance in terms of tag detection range. The tags are therefore specially designed keeping into consideration such proximity.

Moreover, these metal mounted RFID tags are available in much larger size, typically more than 3 cm, which makes them all the more undesirable. Hence, with articles of intricate and elegant make, these large sized tags are observed as undesirably negating their ensuing value. For example, in case of gold jewelry, one cannot afford to have such large tags directly embedded to some section of the jewelry. This prompted the experts to work on the positioning of these tags with respect to the attaching metal. The solution was found in embedding these tags into highly valued items, mostly metallic in nature. This however rendered these tags non-reusable, and suitable for article only of large make, like vehicle part tools/data center racks etc.

Furthermore, since finished articles come in different shapes and sizes, it becomes imperative to optimize each item (may be by using commercial electromagnetic simulators) for enhanced electrical performance, which is practicably an uneconomical and non-feasible solution.

It therefore appears that the biggest technical challenge lies in slenderizing the RFID tag itself. If, accordingly, extremely miniature sized tags are conceptualized, that can seamlessly merge into associating article, it may constitute a technical advance of significant merit to the existing arts.

OBJECTIVES OF THE INVENTION

It is, therefore, a general object of this disclosure to provide a RFID tag assembly capable of seamlessly integrating with an attaching article, not attainable heretofore.

It is a further object of this disclosure to provide a RFID tag assembly that can attach with any external article without requiring modifications due to any detuning effect.

A still further object of this disclosure is to provide a specialized RFID tag for secure tracking of articles associated thereto, right from warehouse to point of sale.

Yet another object of the disclosure is to provide a RFID tag assembly capable of providing greater detection range when attached to external metal, not learned and attained heretofore.

SUMMARY

This problem is solved and a technical advance is achieved in the art by providing a RFID tag assembly enabled article that comprises: a RFID tag assembly connected to an article with a pair of conducting strips, wherein the pair of conducting strips is connected between each end of the RFID tag assembly, respectively, and the article to form an electrical association of said RFID tag assembly with the article. The RFID tag assembly further comprises: an antenna formed from said electrical association of the RFID tag assembly with the article; and a RFID microchip securely embedded within at least one layer of a substrate of the RFID tag assembly, wherein said RFID microchip coordinates with the article and the antenna to establish a stable impedance matching network. A support structure holds at least one end of the article.

In another aspect, the present disclosure provides a method of attaching a miniature RFID tag assembly to an external article, the method comprising:

attaching a pair of conducting strips at each end of the RFID tag assembly, respectively, said pair of conducting strips being connected to end caps of the RFID tag assembly, wherein an external end of each of the end caps is connected to the article for electrically associating the RFID tag assembly with the article to form an antenna;

embedding a microchip of the RFID tag assembly within a layer of a substrate, wherein the microchip is positioned adjacent to the antenna, wherein the microchip coordinates with the article and the antenna to establish a stable impedance matching network; and inserting a support structure through the end caps of the RFID tag assembly to hold the article.

In another alternate aspect a RFID tag assembly is provided. The RFID tag assembly includes a pair of conducting strips. A RFID microchip is connected between the pair of conducting strips, wherein the pair of conducting strips and the RFID microchip forms a closed conductive path. A support structure supports the pair of conducting strips and the RFID microchip. A pair of end caps is provided, each of the end caps positioned on an end of the support structure, wherein the pair of conducting strips is electrically connected to each of the end caps, respectively, wherein when the pair of end caps contact an article, the RFID microchip establishes a stable impedance matching network. A substrate is positioned exterior of the RFID microchip.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Additional features and advantages of the disclosure will be set forth in the description that follows, and in part will be obvious from the description, or may be learned by the practice of the disclosure. These and other features of the present disclosure will become more fully apparent from the following description, or may be learned by the practice of the disclosure as set forth hereinafter.

BRIEF DESCRIPTION OF THE DRAWINGS

The foregoing summary, as well as the following detailed description of preferred embodiments, is better understood when read in conjunction with the appended drawings. For the purpose of illustrating the disclosure, there is shown in the drawings example constructions of the disclosure; however, the disclosure is not limited to the specific embodiments disclosed in the drawings.

FIG. 7(a) illustrating the top isometric view; FIG. 7(b) illustrating the front view; and FIG. 7(c) illustrating the side view.

DETAILED DESCRIPTION OF THE INVENTION

Figure 1:
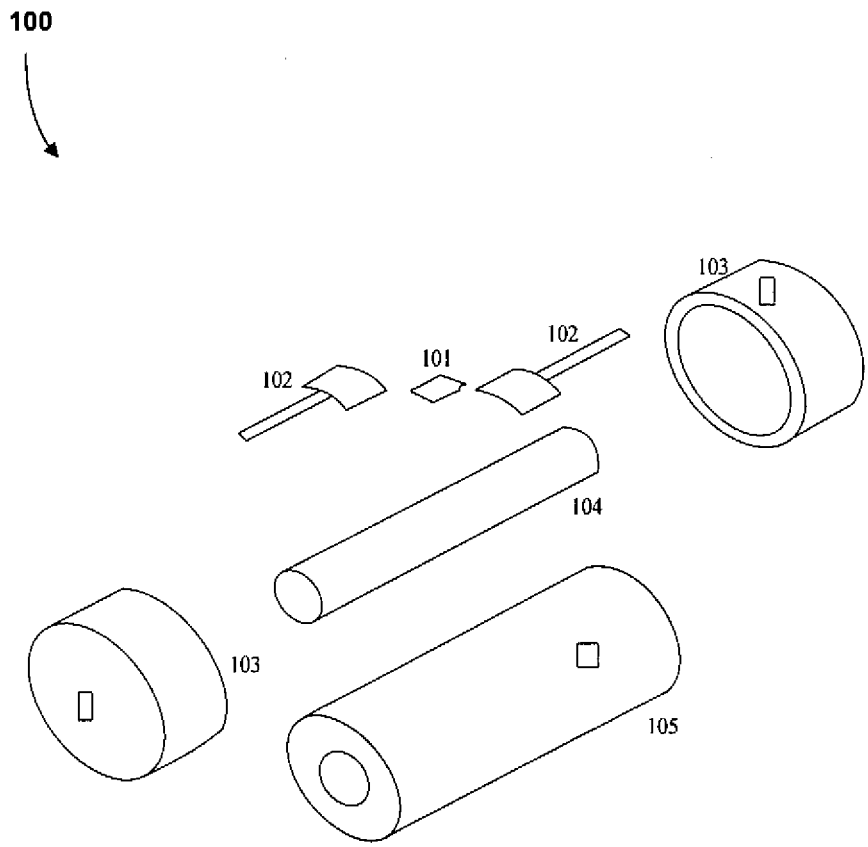
FIG. 1 is an exploded view of RFID tag assembly according to an embodiment of the present disclosure.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

The embodiments described below are directed to a RFID tag assembly attached to an external article, and a method of enabling so. The main components of RFID technology are tags with unique identification number (UID) associated with the external article and the RFID reader or interrogator/antenna. One preferred embodiment of the disclosure considers UHF passive RFID tag requiring no battery or a power source of its own. It rather, uses energy in the RF signals received from the interrogator to power up the tag.

The passive RFID tags are preferable to achieve larger distance transmitting ability with reduced dimensions. Accordingly, one preferred embodiment of the present disclosure proposes a miniature, thin, lightweight passive RFID tag that can be attached to external article or device of any shape, size or form. Additionally, the passive RFID tag operates at frequencies in ultra-high frequency (UHF) band ranging preferably in between 860 MHz-960 MHz.

One general embodiment of the present disclosure includes a RFID tag comprising of a microchip/integrated circuit containing the UID information, and an antenna as an external interface that is configured to be designed to substantially match the input impedance of the microchip.

In one embodiment, an extremely miniature, highly lightweight RFID tag measuring typically less than 5 mm in length and approximately 2.4 mm in external diameter is presented. Such a tag is capable of seamlessly integrating with the external article, preferably a metal. More importantly, not only does the RFID enabled external metallic article not electronically interferes with the tag operation, it actually assists. Additionally the detection range greater than 4-6 inches is found to be achievable with such a configuration. The sections discussed later in the specification shall demonstrate how effectively the association of the RFID tag with the metallic article results in enhanced detection range with increasing size of attaching metal.

Nevertheless, in order to achieve a decent reading range, first the attaching metal article is configured to function as a radiating surface. Additionally, since the metal's dimensions shall be varying widely, the basic impedance matching to the microchip is adjusted to remain stable for every attaching metal piece. Significantly, the above two considerations have been realized with much reduced RFID tag size. It should be noted, however, that all of the above-mentioned enhancements are enabled by assembling the RFID tag with the metal piece in accordance with the ways discussed hereinafter.

The preferred embodiment envisages a miniature passive RFID tag design that connects to each of the two ends of attaching contiguous metallic article, where the metal acts as an external antenna. The metal selected here has a good conducting ability. Note worthily, this antenna and article combination establishes a stable impedance matching network with the RFID microchip; said matching remaining stable for all types of aforementioned good conductor metals. Effecting the binding of this external article to the RFID tag to form an article and antenna combination has converted the ever existing constraint into an opportunity, which constitutes a significant technical advance over the existing works.

The RFID tag of the present disclosure is flexible enough to attach to any size and shape of the article without detuning. The reading range however varies depending on the manner of such attachment to the external metallic article, which shall be indicated in forthcoming sections of the specification. In addition, the process of enabling such an attachment leads to lowest possible tagging cost. The miniature RFID tag thus provides one-step towards "Identity Imprinting" on high value metallic items with primary focus on product authentication and secondary focus on enabling secure method of tracking from warehouse to last point of sale. All the aforementioned advantages are realized with RFID tag not actually interfering with visual aspects of the external article.

Referring now to FIG. 1, an exploded view of a RFID tag assembly 100 along with its components is shown. As can be seen, the RFID microchip 101 is connected on both ends to a pair of conducting strips 102, of a metallic make, to form a closed conductive path. In one embodiment, the conducting strips 102 are made of Copper trace that forms a stable impedance matching network when an external metallic article is soldered to it. The external metallic article is electrically connected to the conducting strips 102 on both ends via metallic end caps 103. Centrally, a thin support structure 104 is provided that is positioned within an internal slot formed in between two ends of the metallic end caps 103, as can be seen in FIG. 1. The support structure 104 is preferably a thin cylindrical rod that fits comfortably between two metallic end caps 103.

In order to achieve the targeted miniature tag size and to negate the detuning effects of metal proximity, the assembly 100 comprises of a flexible substrate 105 with microchip 101 embedded therein, as shown in FIG. 1. In one embodiment, the microchip of Impinj's Monza-4 and the core substrate formed of magnetic films like AB 5000 series (M/s 3M) is considered.

Figure 1A:
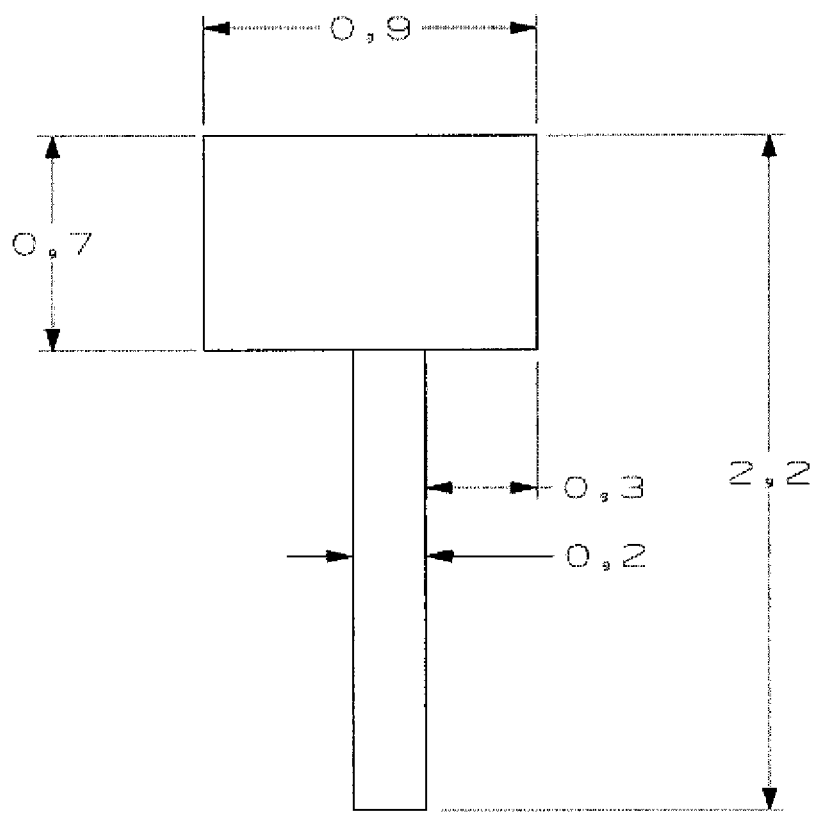
FIGS. 1A(i)-1A(v) present component dimensions in accordance with one illustrative embodiment of the present disclosure.

FIG. 1A provides the dimensions for all the components of RFID tag assembly 100 in one preferred embodiment of the present disclosure. FIG. 1A(i) show preferred dimensions for end caps 103 that is a hollow cylinder with outer dimension of 2.4 mm diameter and 1.1 mm length; and inner dimensions of 2 mm diameter and 1 mm length. FIG. 1A(ii) provides preferred dimensions of the support structure 104 as having 0.8 mm of diameter and approximately 5 mm length. The preferred dimensions for substrate 105 are taken as 5 mm in length, about 2 mm in external diameter and approximately 0.8 internal diameters, as shown in FIG. 1A(iii). Next, in one preferred embodiment, the microchip is shown having dimensions approximating 0.6 mm lengthwise and 0.4 mm widthwise is represented in FIG. 1A(iv). Finally FIG. 1A(v) presents the pair of conducting strips 102 that are formed of a base section having about 0.2 mm thickness and measuring approximately 1.5 mm longitudinally, and a curved section having approximately 0.9 mm width and about 0.7 mm length.

Figure 2:
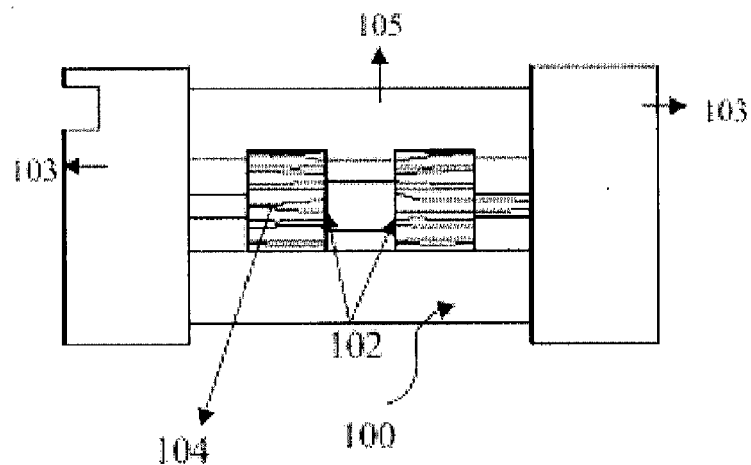
FIG. 2 is a packed RFID tag assembly in accordance with one other embodiment of the present disclosure.

FIG. 2 details an exemplary embodiment of a packed RFID tag assembly 100 measuring approximately 5 mm in length and 2.4 mm in outer diameter. The tag is shown to be connected to external metal end caps 103, which in turn, establishes an electrical association with external attaching metallic article. Importantly, there has to be maintained an electrical isolation between these two end caps; however even a single metallic article can be connected to the two end caps, preferably to result in a loop form. However, the scope is extended to include either circular, rectangular or other such regular shapes. One alternate embodiment enables connecting of two separate metal plates of any shape connected between the two end-caps.

Larger the loop perimeter, greater is the reading range observed for RFID tag assembly. On the contrary, without any external metal attachment, the tag reads nearly 2 inches, and the range increases for additional metal attachment.

Figure 3:
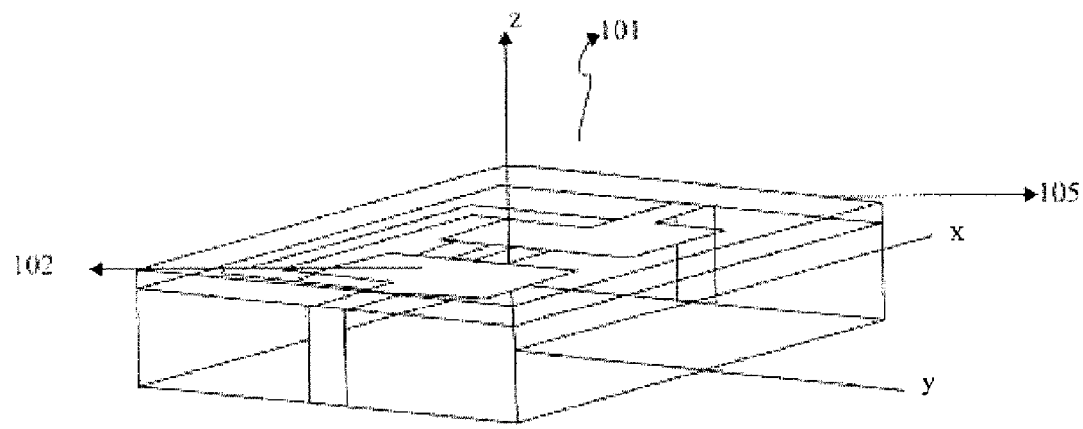
FIG. 3 illustrates exemplary dimension of an RFID tag made in accordance with embodiments of the present disclosure.

Next, FIG. 3 displays a specialized small size bare tag for metal mount. The RFID tag, as shown here, is in rectangular form measuring 3 mm×2 mm×1 mm. The microchip 101 is embedded between two layers of absorber films 105. On the two sides of the tag, conducting strips 102 are exposed that connects to external metallic article via end caps 103. Without any external attachment, the tag is non-functional; it works only when appropriate sized metal pieces are attached.

Figure 4:
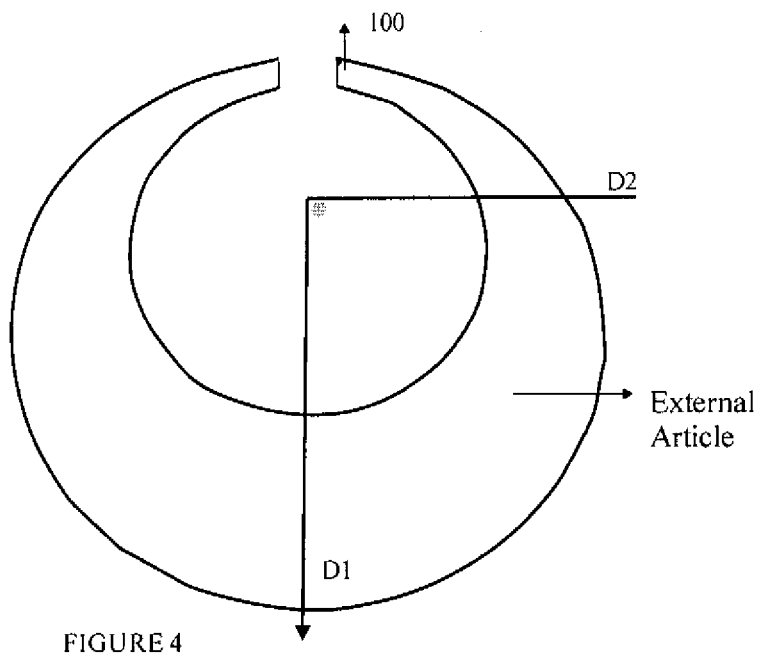
FIG. 4 shows particular embodiment of external metal attachment to the RFID tag assembly.

FIG. 4 shows particular embodiment of external metal attachment to the RFID tag assembly 100. The two end caps 103 are connected to a contiguous metal piece in a loop form. In one embodiment, the contiguous metal is an article of jewelry, such as a ring, caring, bracelet, necklace or other such article that can form a loop topology. As can be seen from the figure, the tag is embedded in the back link and the contiguous article acts as an antenna. While one illustrative dimension for metal piece having an average external diameter of 60 mm, and internal diameter of 32 mm is selected, the other illustrative dimension of the metal piece have an average external diameter of 80 mm, and an internal diameter of 48 mm. The tag design used for both aforementioned illustrative metal pieces is same, and no changes whatsoever, in the tag design is required for different sizes. The Table 1 below shows the corresponding detection range determined for each illustrative embodiment:

TABLE 1

| External Diameter D1 (mm) | Internal Diameter D2 (mm) | Estimated Detection Range (inches) |
|---|---|---|
| 60 | 32 | 23.2 |
| 80 | 48 | 27.4 |

It is clear from Table 1 that the detection range has increased with increasing size of the attaching metal.

Figure 5:
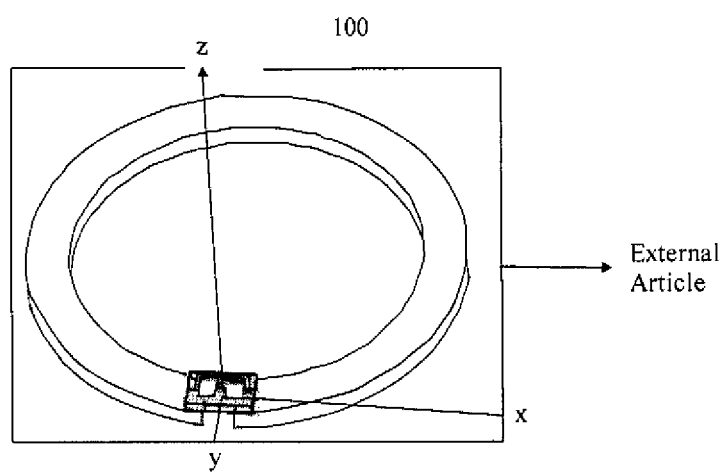
FIG. 5 shows alternate embodiment of external metal attachment to RFID tag assembly.

Similarly, another preferred exemplary embodiment of the present disclosure is presented in FIG. 5, wherein the attaching contiguous metal has a ring configuration. The dimensions selected for assessing the detection range of tag assembly 100 is shown in Table 2 below:

TABLE 2

| Outer Radius (mm) | Estimated Detection Range (inches) |
|---|---|
| 8 | 6.8 |
| 10 | 11.7 |
| 12 | 14.3 |

Table 2 above reiterates the important aspect of the disclosure, which establishes that the detection range of the RFID tag assembly 100 enhances with increased size of attaching metal. Reading FIG. 6 and Table 2 in conjugation, with tag design remaining same, but size of attaching metal increasing, the detection range increases.

Figure 6:
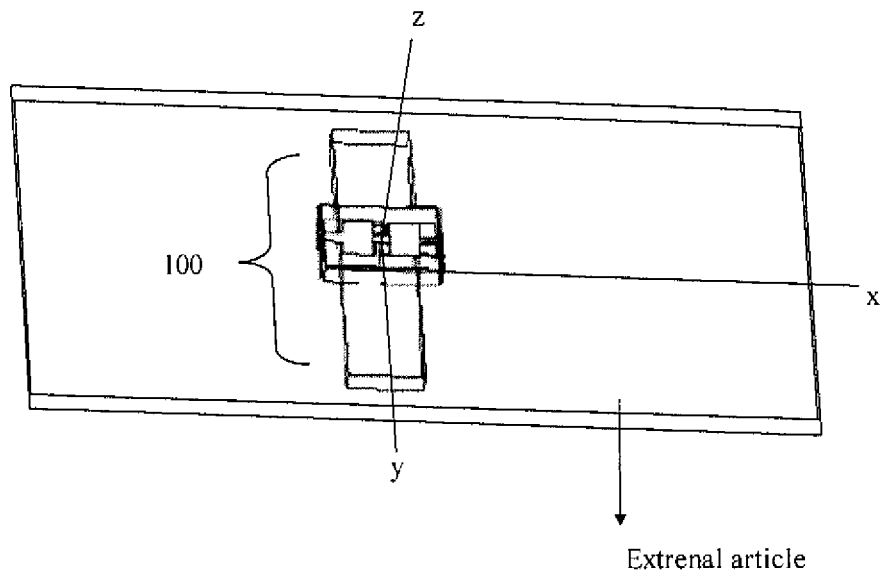
FIG. 6 shows yet another practicable embodiment of RFID enabled external article, in accordance with the principles of present disclosure.

FIG. 6 shows yet another illustrative embodiment of the present disclosure. The contiguous metal chosen here is a metallic plate that has been assessed for performance with two different dimensional measures. The Table 3 below gives the details of chosen dimensions and detection range.

TABLE 3

| Plate Dimension (mm) | Estimated Detection Range (inches) |
|---|---|
| 10 × 20 × 0.5 | 1.5 |
| 20 × 40 × 0.5 | 2.0 |

Figure 7A:
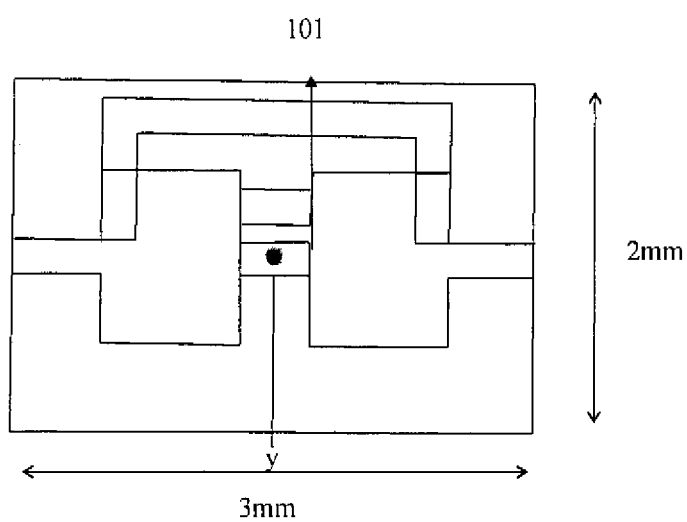
FIGS. 7(a) to 7(c) show exploded views of one construction of RFID tag in accordance with an exemplary embodiment.
Figure 7B:
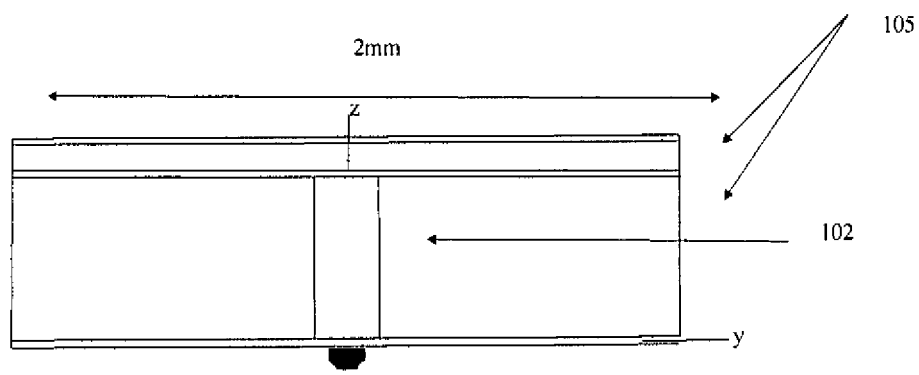
Figure 7C:
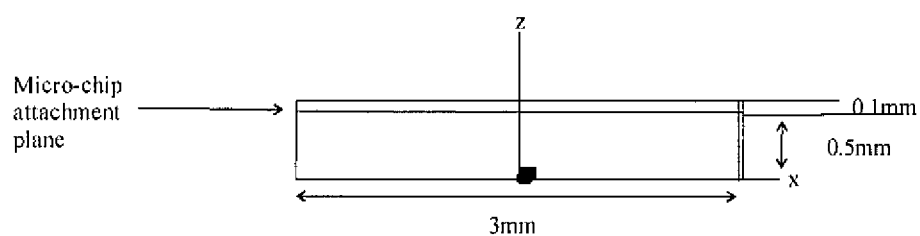

FIG. 7 shows, in an exploded view, one construction of RFID tag assembly 100, in accordance with an exemplary embodiment of the present disclosure. FIG. 7(a) shows a top isometric view of the RFID tag. The microchip 101 is shown embedded within the substrate 105, and electrically connected to a pair of conducting strips 102. The size of bare tag is preferably selected in the range of 3 mm×2 mm. In FIG. 7(b), a front view of bare tag is shown where the substrate 105 approximately measures 2 mm breadth wise. FIG. 7(c) is a side view of bare tag, which shows measuring dimensions of tag module for metal mount. While the microchip 101 attachment plane is selected of height approximating 0.1 mm from the base of tag, the substrate 105 is positioned at a height preferably approximately 0.5 mm from the tag base.

While the above dimensions have been described in connection with a preferred embodiment, it is to be understood that the subject matter encompassed by way of the present disclosure is not just limited to these specific dimensions only, but all its obvious modifications as well.

One preferred embodiment of the disclosure establishes ultra-miniature size i.e. 5 mm or less of the RFID tag in both cylindrical and rectangular forms. As explained and illustrated already, the specialized tag design is applicable for different metal shapes and forms without the consideration of detuning effects or re-designing of impedance matching network.

Figure 8:
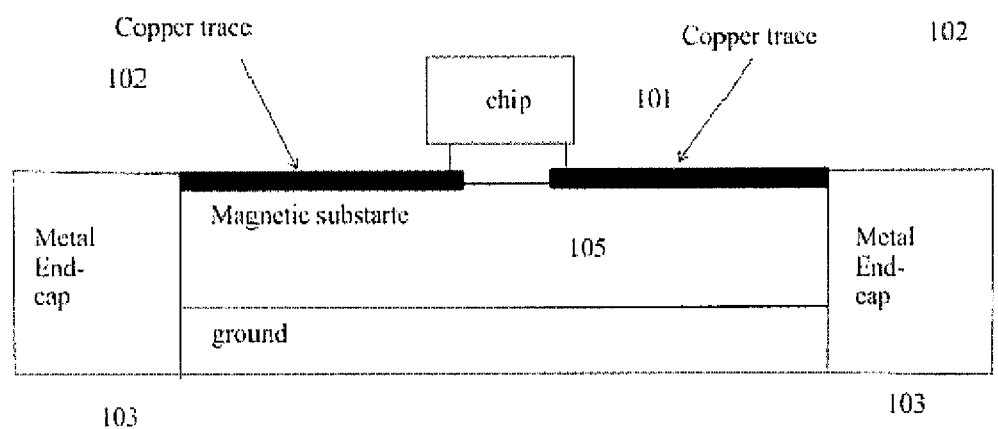
FIG. 8 is a diagram-showing establishment of impedance matching network, in accordance with an embodiment of the present disclosure.

The stable impedance matching network is established by conducting strips 102, which acts as stepped impedance transformer for the tag assembly 100. Further as shown in FIG. 8, if the inner substrate 105 is straightened, the conducting strips 102 becomes a micro-strip design with two short walls on both sides. Since a magnetic substrate is chosen, electric field remains mostly concentrated thereby reducing the overall size. Further, since two metallic end caps 103 are already present at each end, any additional metal does not affect the stability of impedance matching network.

It is clearly understandable that for a proper tag design, the RFID microchip 101 needs to get impedance matched to the antenna in a complex conjugate manner. This requires that the designed antenna's inductive effect must tune out the chip's capacitive effect and the resistive components of both should be same. However, if the resistive component of the antenna is of small value, the overall tag design would still function as near-field tag.

In the present disclosure, the chip' reactive component is matched using copper trace impedance transformer sections on magnetic substrates. The utilization of end-caps 103 and the center metallic rod 104 provides for a near-field loop like structure. The magnetic substrate 105 concentrates the field within the small volume thereby reducing the overall size. The end-caps 103 and the center metallic rod 104 provides for the small resistive component. When this tag is connected to the external attachment, the changes in reactive component is minimal, whereas the resistive component changes. That is why the detection range increases.

Without any external metal attachment, the stand-alone tag works as near-field tag (small detection range); when external metal is attached, the radiation resistance increases (due to increase in aperture size) and the detection range increases. The design of the present disclosure also ensures that the reactive component does not alter significantly. Thus the tag remains tuned.

A further preferred embodiment of the present disclosure, provides a method of attaching the RFID tag assembly 100 to the external attaching article. Firstly, the pair of conducting strips 102 is attached at each end of the RFID tag for enabling electrical association of the RFID tag assembly 100 with the article to form an antenna. Next, the microchip 101 of the RFID tag assembly is placed securely within at least one layer of substrate 105, and is positioned adjacent to the article and antenna to establish a stable impedance matching network. Finally, a support structure 104 is inserted through the end caps 103 for holding the external article.

The foregoing description of specific embodiments of the present disclosure has been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the claims appended hereto and their equivalents. The listing of steps within method claims do not imply any particular order to performing the steps, unless explicitly stated in the claim.

We claim:

1. A radio-frequency identification (RFID) tag assembly enabled article, comprising:
   a RFID tag assembly connected to an article with a pair of conducting strips; wherein the pair of conducting strips is connected between each end of the RFID tag assembly, and wherein the article forms an electrical association of said RFID tag assembly with the article, the RFID tag assembly further comprising:
      an antenna formed from said electrical association of the RFID tag assembly with the article; and
      a RFID microchip securely embedded within at least one layer of a substrate of the RFID tag assembly, wherein said RFID microchip coordinates with the article and the antenna to establish a stable impedance matching network; and
   a support structure holding at least one end of the article, wherein the support structure comprises a metal rod.

2. The RFID tag assembly enabled article of claim 1, wherein the RFID tag assembly has a 5 mm length measurement and a 2.4 mm external diameter measurement.

3. The RFID tag assembly enabled article of claim 1, wherein the RFID tag assembly is a passive RFID tag working in an ultra-high frequency range of 860 MHz-960 MHz.

4. The RFID tag assembly enabled article of claim 1, wherein the article is constructed from a metal.

5. The RFID tag assembly enabled article of claim 1, wherein the article further comprises a metallic article having a differing size, and wherein the RFID tag assembly is connected externally to the metallic article without requiring modifications due to a detuning effect.

6. The RFID tag assembly enabled article of claim 1, wherein the RFID microchip has a dimension of 0.6 mm length and 0.4 mm width.

7. The RFID tag assembly enabled article of claim 1, wherein the electrical association of the RFID tag assembly with the article are formed by connecting end caps of the RFID tag assembly to the article.

8. The RFID tag assembly enabled article of claim 7, wherein the end caps of the RFID tag assembly have outer dimensions of 2.4 mm diameter and 1.1 mm length, and inner dimensions of 2 mm diameter and 1 mm length.

9. The RFID tag assembly enabled article of claim 1, wherein the substrate is an absorber film.

10. The RFID tag assembly enabled article of claim 9, wherein the absorber film further comprises a magnetic material.

11. The RFID tag assembly enabled article of claim 1, wherein the substrate has a length of 5 mm, an external diameter of 2 mm, and an internal diameter of 0.8 mm.

12. The RFID tag assembly enabled article of claim 1, wherein the pair of conducting strips further comprise a copper metal.

13. The RFID tag assembly enabled article of claim 1, wherein the pair of conducting strips further comprises: a base section having a thickness of 0.2 mm, a longitudinal measurement of 1.5 mm, a curved section having a width of 0.9 mm, and a length of 0.7 mm.

14. The RFID tag assembly enabled article of claim 1, wherein the support structure has a length of 5 mm and an external diameter of not more than 0.8 mm.

15. The RFID tag assembly enabled article of claim 1, wherein the article further comprises a jewelry item.

16. The RFID tag assembly enabled article of claim 15, wherein the jewelry item has a loop configuration, wherein the loop configuration is at least one of a ring, a necklace, and an earring.

17. A method of attaching a RFID tag assembly to an external article, the method comprising:
   attaching a pair of conducting strips at each end of the RFID tag assembly, said pair of conducting strips being connected to end caps of the RFID tag assembly, wherein an external end of each of the end caps is connected to the article for electrically associating the RFID tag assembly with the article to form an antenna;
   embedding a microchip of the RFID tag assembly within a layer of a substrate, wherein the microchip is positioned adjacent to the antenna, and wherein the microchip coordinates with the article and the antenna to establish a stable impedance matching network; and
   inserting a support structure through the end caps of the RFID tag assembly to hold the article.

18. The method of claim 17, wherein the RFID tag assembly is embedded within the article.

19. An RFID tag assembly comprising:
   a pair of conducting strips;
   a RFID microchip connected between the pair of conducting strips, wherein the pair of conducting strips and the RFID microchip forms a closed conductive path;
   a support structure supporting the pair of conducting strips and the RFID microchip, wherein the support structure comprises a metal rod;
   a pair of end caps, wherein each end cap is positioned on an end of the support structure, and wherein the pair of conducting strips is electrically connected to each end cap, and wherein the RFID microchip establishes a stable impedance matching network when the pair of end caps contact an article; and
   a substrate positioned exterior to the RFID microchip.

* * * * *